United States Patent Office 3,516,185
Patented June 23, 1970

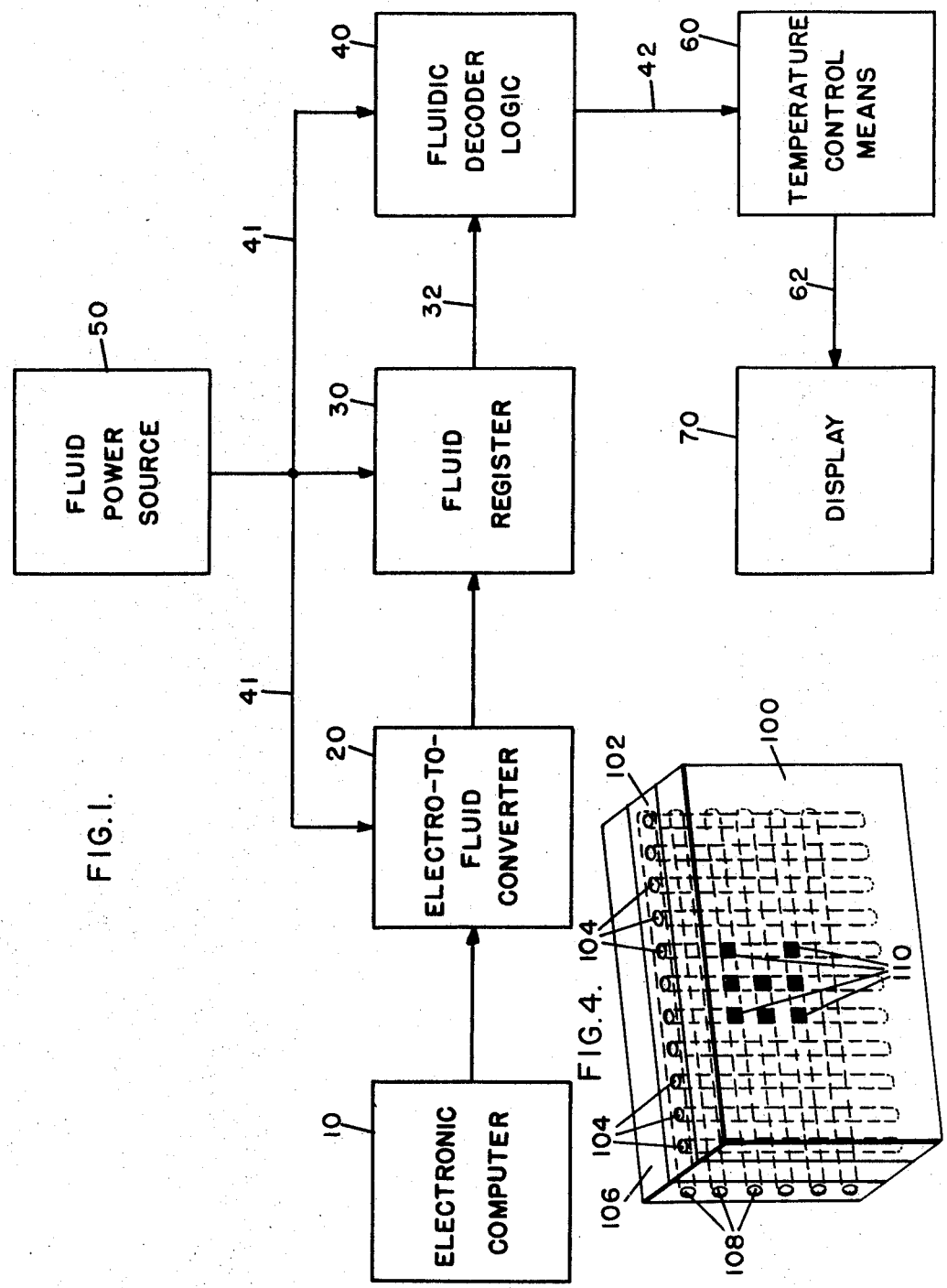

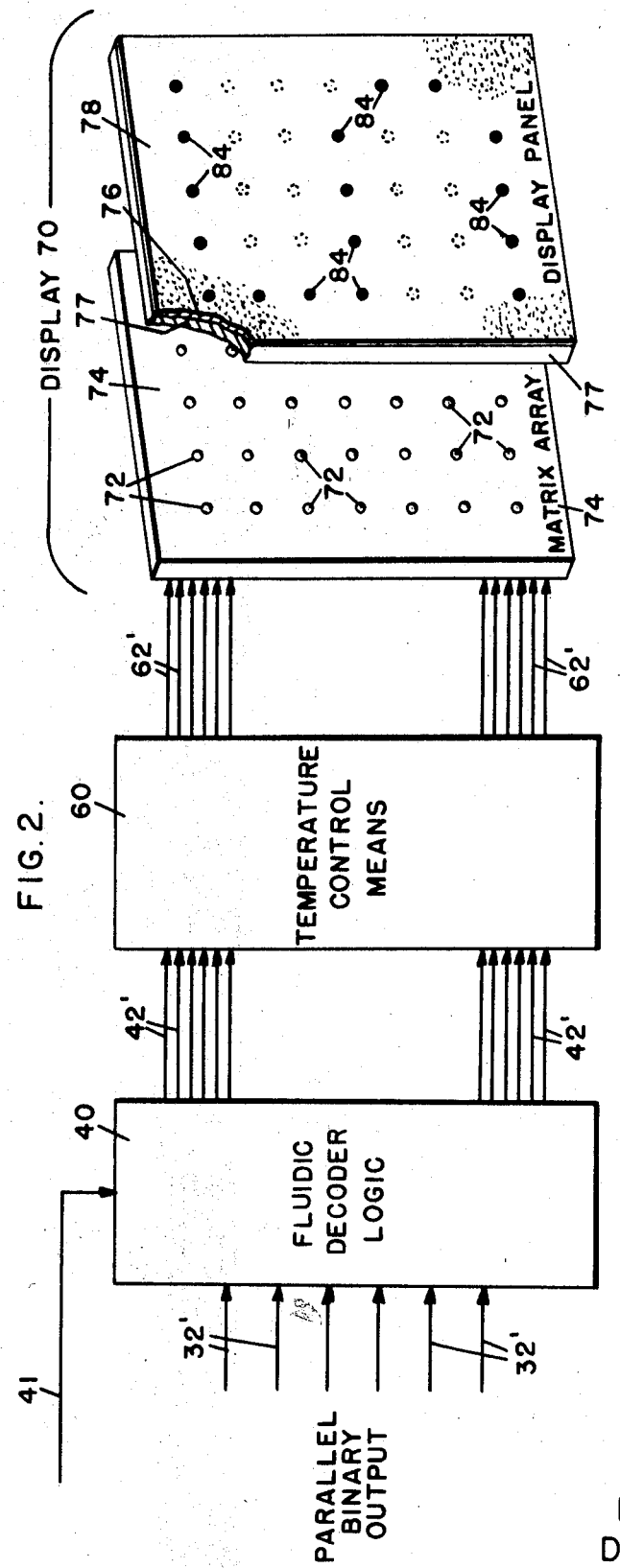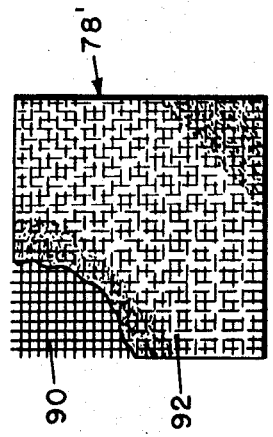

3,516,185
FLUIDIC-THERMOCHROMIC DISPLAY DEVICE
Thomas O. Paine, Deputy Administrator of the National Aeronautics and Space Administration, in respect to an invention of Edwin H. Hilborn, Boston, Mass., and Daniel Grafstein, Morristown, N.J.
Filed July 1, 1968, Ser. No. 741,461
Int. Cl. G09f 11/00
U.S. Cl. 40—28                                    14 Claims

ABSTRACT OF THE DISCLOSURE

A display device is disclosed in which a selectively controlled output from a fluidic system of liquids or gases through orifices impinges upon a surface containing thermochromic materials to yield a readily observable and reversible color change. The color transition is sharp and is clearly visible under high ambient light conditions.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to display systems, and in particular, to a fluidic display having no solid moveable parts and which is readable under high ambient illumination levels.

An increasing need exists to view information presented by display devices under conditions of high ambient illumination, such as often prevail in both aircraft and space vehicles and in central command rooms. In aerospace vehicles particularly, visual displays may be subject to variations in illumination levels encompassing a range of several orders of magnitude. The more traditional displays that incorporate mechanical movements, such as the dials of meters, are usable under these extremes of ambient, but they suffer from the disadvantages of moving parts and catastrophic failure modes.

More modern nonmechanical systems, such as electroluminescent (EL) displays or CRT's, saturate at brightness levels far too low to allow their use in high ambients. In these devices, a phosphor material emits light (luminescence) as a result of the application of an electric field, in the case of electroluminescent materials, and bombardment by an electron beam, in the case of cathodoluminescent materials. One of their main limitations is the relatively low brightness levels and the concomitant low contrasts that have been achieved. Attempts to increase the brightness of EL displays by increasing the applied electric field and its frequency result in a severe lowering of the lifetime of the material.

Other approaches included the use of scotophors which are materials whose change in opacity under electron beam bombardment is viewed by reflected light. The alkali halides, such as potassium chloride, are darkened under excitation by high-energy particles such as X-rays or beta rays. This darkening is the result of the formation of color centers (trapped electrons) in the material. Alkali halides thus provide better contrast when viewed under high ambient illumination. The image will remain on the screen until the trapped electrons are freed by heating or other means. Several devices utilizing an alkali halide are commercially available; among these are the Recorditron tube and dark trace tubes. While these produce images useful under high ambient illumination levels, erasure to allow rapid updating of information is extremely difficult.

Photochromic materials are also viewed by reflected light. These change color by absorption of light of a particular wavelength, usually in the ultraviolet range. The color can be erased by heating or by illumination of the colored form of the material by light of longer wavelength than was used to accomplish the initial color change.

The concept developed herein is to display information using thermochromic materials that will change color upon activation by heat and revert to their original color when cooled. The observation of the color change in these materials is due to a differential reflection of the ambient light by the two different-colored forms. A fluidic/thermochromic display does not unduly burden the electronic system of the aircraft or space vehicle.

The high reliability of fluidic systems, coupled with their resistance to temperature extremes, vibration, and radiation among other things renders such systems of wide interest to modern designers. Despite this, only meager consideration has been given to requirements for the display of the status of the system. Previously, pneumatically-driven bead elements have been moved into and out of view to provide binary indications. Bead elements have also been assembled in matrices to allow the display of alphanumeric data. However, the use of any solid mechanical element immediately reduces the potential system reliability, an attribute which may provide the major rationale for the selection of a fluidic rather than an electronic system.

OBJECTS AND SUMMARY OF THE INVENTION

Accordingly, it is the principal object of the present invention to improve information display devices.

It is a further object of this invention to improve display devices of the fluidic/thermochromic type.

Another object of this invention is to provide a display system with materials having unique properties for the display of fluidic system status and without requirements for moving parts.

A further object of this invention is to provide a display readable under conditions of high ambient illumination.

Another object of this invention is to provide a display system containing layers of thermochromic materials which, as the temperature of the layer is changed, exhibit a reversible change of color.

SUMMARY OF THE INVENTION

According to the present invention a selectively controlled output of fluid is directed through a series of orifices onto a thermochromic panel to produce an observable and reversible color change in the thermochromic material, said orifices being arranged to form an alphanumeric display.

BRIEF DESCRIPTION OF THE DRAWINGS

The invention as well as the objects and advantages thereof will be more readily understood from the following detailed description when taken together with the accompanying drawings, wherein:

FIG. 1 shows an overall block diagram of the preferred embodiment employing the concepts outlined herein;

FIG. 2 is a block diagram of a portion of the FIG. 1 and depicts an exploded view, partly in section, and the display panel.

FIG. 3 is a view, partly in section, of another embodiment of the display panel of the FIG. 2; and, FIG. 4 is a perspective view of a coincident fluid display panel which is a further embodiment of the display panel of the FIG. 2.

DESCRIPTION OF THE PREFERRED EMBODIMENT

To more fully appreciate the invention, it is desirable to first consider basic properties of thermochromic materials. Thermochromism is the ability of a material to change color as a result of a change in temperature in that material. The color response to the temperature change may be slow or fast, sharp or gradual, depending among other things upon the means used to control the temperature of the fluid and the substrate material upon which the thermochromic is deposited.

Thermochromism has been observed in a variety of organic and inorganic materials, and the mechanism has been found to vary with the molecular structure of the material. The types of mechanisms invoked to explain the thermochromic activity have included equilibrium between two molecular species, broadening of a near ultraviolet absorption curve, ring opening, thermal achievement of a triplet state configuration, formation of free radicals, and order-disorder phenomena. Many of these mechanisms, however, involve the severance of chemical bonds and/or the migration of chemical species. In such systems, the rate of the color change with temperature of the material is relatively slow, and thus not suitable for display purposes.

For information display applications, the color changes must preferably be rapid and result in a sharp contrast of one color on another. Since both maintenance and power requirements are also important factors in aircraft and spacecraft applications, the materials should also show good thermal stability and require low power when they are incorporated into the display system. Ternary halides and chalcogenides have been found to be most useful for this purpose. The color change in these materials involves a rearrangement of cations in a closely-packed anion crystal lattice where no breaking of chemical bonds occurs, and thus there appears to be no upper limit to the rate at which such transitions, often called order-disorder reactions, can occur.

Before actually discussing devices for which thermochromics are being considered, some of the properties that make them attractive for such devices will be described. In principle, it is feasible to design repetitively driven thermochromic displays which are flicker free, even with low repetition rates. A standard phosphor, even one having so-called long persistence, reaches peak brightness almost immediately after being pulsed, and then gradually decreases in brightness. Thus, fairly rapid repetition rates are necessary if the flicker is to be avoided. For a repetitively driven display using thermochromics, however, it is only necessary to repeat the signal before the material has cooled below the transition temperature to obtain a completely flicker-free display, because of the fact that thermochromic materials have only two distinct states. This behavior becomes important, particularly when the displayed information is being derived from a computer, because it permits the use of a slower computer and reduces the size of the computer memory that is required.

The rise time and persistence of the thermochromic display is a function of a number of material and experimental parameters. These include the heat and temperature of transition, heat capacities, and thermal conductivities of both the thermochromics and the various substrates employed. Persistence can be controlled by a suitable selection and trimming of these parameters.

The mass and thermal conductivities of the substrates are particularly easy parameters to adjust for the generation of a set of desired rise times and persistence values. As will be discussed later, a wide range of transition temperatures is also available, but, of course, the selection of any particular thermochromic fixes the transition temperature and the heat of transition. Persistence values and rise times are also a function of the ambient thermal level as well as the rate and magnitude of the energy input.

Because thermochromic materials do not emit light, but differentially reflect incident ambients, the operation of thermochromic devices is not limited by the usual energy transfer relationships, where emission occurs at longer wavelengths than the energy which produced it, as is the case with phosphors. Thus, with thermochromics, a visible color change can be produced by infrared stimulation.

Another property, namely the large difference in electrical conductivity between the high- and low-temperature forms, provides an added storage mechanism and control element which may be useful when, for example, thermochromics are combined with electroluminescent materials. It should be mentioned, however, that this property is specific to those thermochromic materials that result from an order-disorder mechanism. Research efforts, thus far, have emphasized this type of thermochromic material.

Since the thermochromic change is accomplished by heating, a variety of display devices have suggested themselves depending on the mechanism used to heat the material.

A variety of such materials are suitable for display purposes, including but not limited to silver mercuric iodide ($Ag_2HgI_4$), copper mercuric iodide ($Cu_2HgI_4$), zinc gallium sulfide ($ZnGa_2S_4$), zinc gallium sulfo-selenide ($ZnGa_2S_3Se$), cadmium gallium selenide ($CdGa_2Se_4$), gallium mercuric sulfide ($Ga_2HgS_4$), zinc indium sulfide ($ZnIn_2S_4$), cadmium indium sulfide ($CdIn_2S_4$), and silver lead iodide ($xAgI$-$yPbI_2$). All of these materials exhibit pronounced color change when a jet of heated fluid impinges upon them. The change in color occurs at a specific temperature characteristic of the composition of the material and is invariant. In the materials of interest two color states exist (i.e., a low temperature form and a high temperature form); and thus the binary nature of the output can be employed to provide a visible display of useful information such as alphabetical or numerical characters. The hue change can in most instances be accentuated by the use of an appropriate colored filter overlay.

While not all of the potential ternary halides or chalcogenides are useable or possible because of crystal spacing or because the pure materials are black at all useful temperatures, it should be understood that partial substitution of either anions or cations is possible to provide additional useful compounds. One such variation involves the effect on both the transition temperatures and contrast of $Ag_2HgI_4$ from substituting specific increments of bromine atoms for iodine and/or specific increments of cadmium for mercury.

Although these materials are ordinarily not physically self-supporting, wide choice is possible in the selection of a substrate, including glass, metal, paper, and most of the plastic sheet compositions. Control of the energy requirements, sensitivity, and the speed of write and erase are possible among other means by (1) variations in the thickness and porosity of the several substrates, (2) choice of the particular thermochromic material, and (3) the temperature, flow rate, and specific heat of the fluid stream employed.

Where a matrix-type display is required for the presentation of graphics or alpha-numerics, selective control of fluid flow through the several orifices would normally be accomplished by the use of fluidic logic; but it should be understood that other means of flow control are possible without departing from the spirit of the invention.

Consideration may also be given to the use of a thermochromic panel maintained normally at its high temperature form, and with information displayed by the impingement of fluid streams at temperatures below the transition temperature of the thermochromic material as an additional example of a concept which does not depart from the spirit of the invention.

Shown in FIG. 1 is a preferred embodiment of the invention, incorporated in a display system. The information to be displayed is generated by an electronic computer 10 of conventional design and fed in a language form used by the computer—e.g., pure binary form—into an electro-to-fluid converter 20. The electro-to-fluid converter 20 transforms the electrical binary signals from the computer 10 into pneumatic binary signals by utilizing a second input from a fluid power source 50. The fluid power source 50 may be an air compressor or a conventional variety of pressurized gas storage; and, the electro-to-fluid converter 20 may be similar in design to those developed and described in NASA contract report NASA-CR-77547, Mar. 25, 1966.

The pneumatic binary output of the electro-to-fluid converter 20 is next fed into a fluid register 30. The fluid register 30 comprises multiple stages of fluid amplifiers in a manner similar in principle to that described in U.S. Pat. No. 3,201,041 and acts as a memory device for the storage of data. The electro-to-fluid interface, which comprises the electro-to-fluid converter 20 and the fluid register 30 may be either parallel or serially operated. Parallel operation of the converter 20 eliminates the need for the fluid register 30, since its principal function is to convert the serial input into a parallel output preferred to operate the display to be hereinafter described.

With continued reference to the FIG. 1, the parallel binary output from the fluid register 30 is fed via a set of tubes 32 to a fluidic decoder logic block 40. This decoder logic block 40 transforms the pneumatic binary information into corresponding pneumatic signals to a display 70 in a manner somewhat similar to an electronic transformation. Basic fluid logic components are described, for example, in U.S. Pat. No. 3,107,850. This decoded information is then fed via a set of conduits 42 through a temperature control means 60. The temperature control means 60 may be of the resistive heating type with resistive windings around each of the conduits or tubes 42 and maintained constantly at an ON status while the system is in the operating mode.

With reference to the FIG. 2, the temperature control means 60 must raise the temperature of the fluid sufficiently to produce the desired color change in a thermochromic material 76 on the front surface of a panel 78. The heated fluid then passes via a set of tubes 62' through a series of orifices 72 in a matrix array 74 and impinges upon the display panel 78, changing the color of the thermochromic material 76. By selecting certain of the conduits 62' for the passage of fluid, the desired display is thus produced.

FIG. 2 shows the display panel 78 having a cutaway portion with the layer of thermochromic material 76 deposited on a substrate 77 such as plastic, paper, or metal. A further possibility is the use of a fine mesh as a substitute for the solid substrate.

Such is shown in the FIG. 3 wherein a display panel 78' is composed of a thermochromic material 92 positioned on a screen or fine mesh 90. The display panel 78' of the FIG. 3 could be substituted for the display panel 78 if the use of the former panel is more desirable. A certain amount of flexibility is present in the display panel 78' of the FIG. 3.

The use of a substrate is indicated by the fact that the thermochromic material 76 is generally not self-supporting. The thermochromic material 76 may be embodied in a lacquer-like formulation and applied to the substrate 77 by any of several standard application methods such as brushing, spraying, pressing, blowing, etc.

The preferred embodiment of the invention utilizes a matrix array 74 having a 5 x 7 direction of orifices as illustrated at 72. With the use of such an array, a display of numerical, alphabetical, or alpha-numeric characters may be realized. However, it will be understood that the matrix array 74 can be comprised of any number of suitable orifices or apertures 72. FIG. 2, by way of example, illustrates a display of the digit 5 wherein the areas 84 have changed color to so indicate the digit 5. The operation of the device will be detailed hereinafter.

Further, while the preferred embodiment discussed here has concerned itself with the presentation of alpha-numeric characters which are typically displayed on a 5 x 7 matrix, extension of the technology to larger matrices suitable for the presentation of graphical data is possible. With such larger matrices, the essentially binary character of the thermochromic material may be used advantageously, in that rows and columns may be addressed rather than individual matrix elements. By appropriate control of fluid temperature and flow, the visible thermochromic change may be made to occur only where there is coincidence of flow at the intersection of a particular row and column, with the remaining elements in the row and column not visibly changed because there is insufficient thermal energy in the fluid flow. By so doing, the number of required fluidic control elements may be reduced from $N^2$ to $2N$.

With reference to the FIG. 4, a coincident type matrix is illustrated wherein a color transition will occur only at areas contiguous to conduits, e.g., a conduit in the X direction and a conduit in the Y direction. For example, a display panel 100 has suitably coated or fixed thereon a thermochromic of the present invention. Immediately behind the display panel 100 and in contact therewith is a first matrix 100 which supports a plurality of vertical or Y conduits 104. Similarly, immediately behind the matrix 102 is a similar matrix 106 which supports and positions a plurality of horizontal or X conduits 108. By selecting the appropriate conduit 104 and the appropriate conduit 108, a color transition will occur in the display panel 100 at the area which is common to the selected conduit 104 and conduit 108. The passage of a fluid through an X conduit 108 only will not cause a color transition to occur. Similarly, passage of fluid through any of the Y conduits 104 only and at a preselected temperature, will likewise not cause a color transition to occur in the display panel 100; however, as previously stated, a coincidence of fluid through conduits 104 and 108 will cause a color change. As shown in the FIG. 4, the letter E has been formed as indicated at 110 by selecting the appropriate conduits 104 and 108.

With reference to the FIG. 1, the entire operation will now be described. It will be assumed that the electronic computer 10 has selected the characters to be displayed on the display 70. This information will be transferred to the electro-to-fluid converter 20 which performs an electrical to fluid conversion as previously set forth. This function is accomplished in cooperation with the fluid power source 50 as indicated. From the converter 20, the information is directed to a fluid register 30 and thereafter via the conduits 32 to the fluidic decoder logic 40.

With reference now to the FIG. 2, certain of the conduits 42' which couple the decoder logic 40 to the temperature control means 60 will have been selected so that fluid from the temperature control means 60 on the conduits 62' will be maintained (raised or lowered) to a temperature sufficient to cause a color transition on the display panel 78. As a result, the fluid emerges from the orifices or apertures 72 due to their coupling to respective conduits 62'. The temperature of the temperature control means 60 is selected so as to cause a color change and thus, the thermochromic material 78 will change color as indicated at 84 in accordance with the selected orifices 72 and conduit 62'. In the foregoing example, it is assumed that the temperature of the fluid would be raised so as to cause a color change in the thermochromic material but it will be readily understood that "negative" logic may be employed, i.e., the fluid in the conduit 62' may be normally at the elevated temperature and selectively cooled so as to cause a color transition to occur from its "upper" state to its "lower" state. As illustrated in the FIG. 2, the digit 5 is displayed and accordingly, appropriate orifices 72 and conduits 62' were selected so as to cause this color transition.

It will be readily understood that the display panels of the FIG. 3 and the FIG. 4 may be readily substituted for the display panel of the FIG. 2. The substitution of the display panel 100 of the FIG. 4 would involve two fluidic decoder logic circuits 40 and temperature control means 60, one pair of elements 40 and 60 coupled to control the horizontal conduits and the second pair of elements 40 and 60 coupled to control the vertical elements.

Thus, there has been described and illustrated a fluidic/thermochromic display device wherein selected areas of the thermochromic material on the display may be caused to go through a color transition. Any suitable fluidic means along with a temperature control means may be employed to cooperate with the thermochromic display panel and thus provide a display through a color transition of the thermochromic material. If the input signals are in the form of electronic signals, appropriate means have been illustrated which will convert the electronic signals into fluidic signals which are useable by the device.

The thermochromic material may be supported by a rigid substrate or as another embodiment, may be supported on a fine mesh or screen so as to permit flexibility of the display panel. The flexible panel may be desirable for many uses. Further, an XY display panel is illustrated and described which permits a color change upon coincidence of fluid flow at a preselected temperature through a selected vertical and horizontal conduit. Fluid flow through a horizontal conduit only or through a vertical conduit only, will not result in a color change of the thermochromic associated with that point of coincidence.

While the present invention has been described in a preferred embodiment, it will be obvious to those skilled in the art that various modifications can be made therein without departing from the scope of the invention; and, it is intended that the appended claims cover all such modifications. By way of example, variations in the matrix configuration, substrate, and thermochromic material are readily foreseeable. In addition, a pure fluid computer such as the one described in U.S. Pat. No. 3,190,554 may be used instead of the electronic computer, thus eliminating the need for the electro-to-fluid converter. Further, the display may be operated by maintaining the thermochromic material at its high temperature state (where it is exhibiting one characteristic color) and using a fluid whose temperature is at a lower temperature to cause the material to change to its lower temperature state (and exhibit another color) and thus create a "reverse display." After the transition curve of a thermochromic is known, it may be found that the latter operation is preferable since the first-color-to-second-color transition curve will generally differ from the second color-to-the-first-color curve. Also, as a further embodiment, all the conduits to the temperature control means could be supplied with fluid at a first temperature and the temperature control means could be selectively controlled to heat (or cool) only the fluid in those conduits corresponding to the display that is contemplated. This embodiment has an added feature in that the fluid at the first temperature (those positions not selected for a display) will tend to remove the heat (or add heat) at the display panel and thus prevent "overcarry" to non-selected areas of the display panel.

What is claimed is:

1. A display system comprising a display array bearing a temperature responsive material, means for directing a fluid at a preselected temperature toward said display array and said material, and means for selecting certain of said means for directing a fluid so that the fluid from the selected means causes a temperature change in corresponding selected areas of said temperature responsive material.

2. A display system as defined in claim 1 wherein said display array includes, in juxtaposition, a matrix array bearing a plurality of fluid apertures and a substrate, said temperature responsive material being a thermochromic and supported by said substrate.

3. A display system as defined in claim 1 wherein said means for directing a fluid includes a plurality of conduits for transporting fluid and means for controlling the temperature of fluid in said conduits.

4. A display system as defined in claim 1 wherein said means for selecting includes a fluid computer.

5. A display system as defined in claim 1 wherein said means for selecting includes a computer, an electro-to-fluid converter coupled to said computer, a fluid register coupled to said converter, and a fluidic decoder logic means coupled between said register and said means for directing a fluid at a preselected temperature.

6. A display system as defined in claim 1 wherein said temperature responsive material contains ternary iodides.

7. A display system as defined in claim 1 wherein said temperature responsive material contains ternary chalcogenides.

8. A display system comprising a substrate, a thermochromic material associated with said substrate, a matrix array adjacent said substrate and said thermochromic material and having formed therein a plurality of apertures, a plurality of conduits communicating with said apertures, a conduit per aperture, means for controlling fluid flow through selected ones of said conduits, and temperature control means associated with said conduits for raising the temperature of said fluid within said conduits so that the thermochromic material adjacent the apertures coupled to the selected conduits will experience a color transition.

9. A display system comprising a substrate having formed thereon a thermochromic material, said thermochromic material having a first hue at a lower temperature and a second hue at an elevated temperature, a matrix array having formed therein a plurality of apertures so as to direct a fluid against said substrate and thermochromic material, a plurality of conduits communicating with said apertures, a conduit per aperture, means for passing a heated fluid through said conduits and said apertures to maintain said thermochromic material at its elevated temperature, and means for reducing the temperature of the fluid in certain of the conduits so that areas of the thermochromic material adjacent the certain apertures are reduced to their lower temperature and thus exhibit their first hue.

10. A display system comprising a display panel of a substrate and a thermochromic material secured thereto, a matrix array adjacent said display panel and bearing therein a plurality of apertures for conducting fluid toward said thermochromic material, a plurality of conduits communicating with said apertures, a conduit per aperture, and temperature control means for controlling the temperature of the fluid in selected ones of said conduits to thereby cause a color transition in said thermochromic material associated with the apertures of the selected conduits.

11. A display panel comprising a substrate, thermochromic material associated with said substrate, a matrix array having formed therein a plurality of apertures for conducting fluid toward said substrate and thermochromic material to thereby cause said thermochromic material to experience a color transition, and a plurality of means for communicating with said apertures for conducting fluid.

12. The display panel as recited in claim 11 wherein said substrate is a screen.

13. A display system comprising a display array bearing a temperature responsive material, said display array including a thermochromic panel having associated therewith a first set of conduits and a second set of conduits, said first set of conduits and said second set of conduits being formed at an angle to each other, means for directing a fluid at a preselected temperature through said first and said second sets of conduits, and means for selecting certain ones of said conduits from each of said sets so that the coincidence of conduits from the first set and from the second set will produce a temperature transition in said thermochromic panel.

14. A display panel comprising a substrate, a thermochromic material formed on said substrate, a first set of fluid bearing conductors adjacent to said substrate, and a second set of fluid bearing conductors adjacent to and at an angle to said first set of fluid bearing conductors.

References Cited

UNITED STATES PATENTS

| | | | |
|---|---|---|---|
| 3,219,993 | 11/1965 | Schwertz. | |
| 3,225,470 | 12/1965 | Schwab. | |
| 3,267,455 | 8/1966 | McGuire et al. | 340—324 |
| 3,323,241 | 6/1967 | Blair et al. | |
| 3,354,565 | 11/1967 | Emmons et al. | |
| 3,405,464 | 10/1968 | Simson | 40—28 |

EUGENE R. CAPOZIO, Primary Examiner

W. J. CONTRERAS, Assistant Examiner

U.S. Cl. X.R.

340—234